Figure 1:
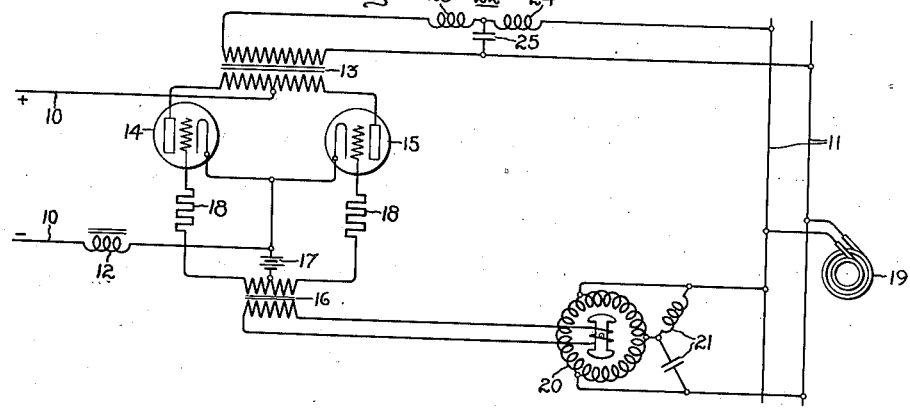

Nov. 3, 1936.  C. H. WILLIS ET AL  2,059,832
ELECTRIC POWER CONVERTING APPARATUS.
Filed Dec. 20, 1934  2 Sheets-Sheet 1

Inventors:
Clodius H. Willis,
Burnice D. Bedford,
by Harry E. Dunham
Their Attorney.

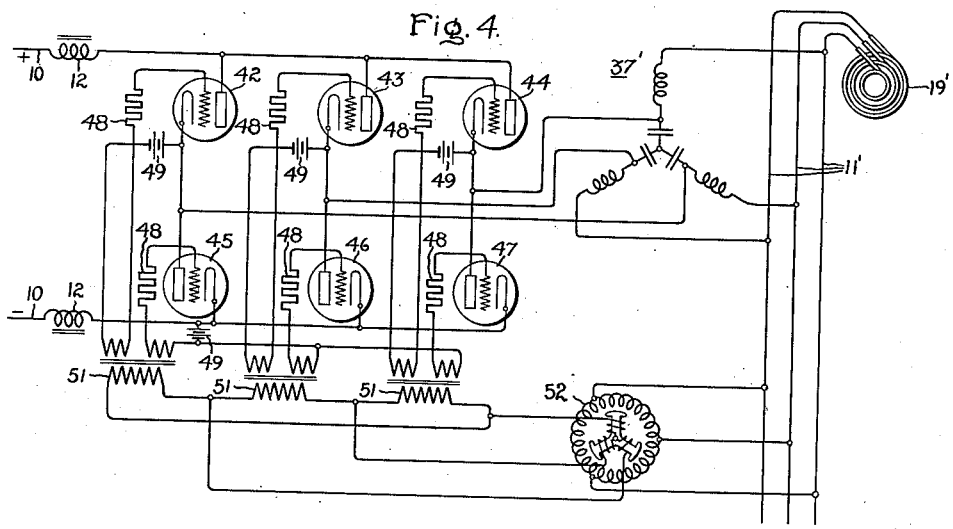
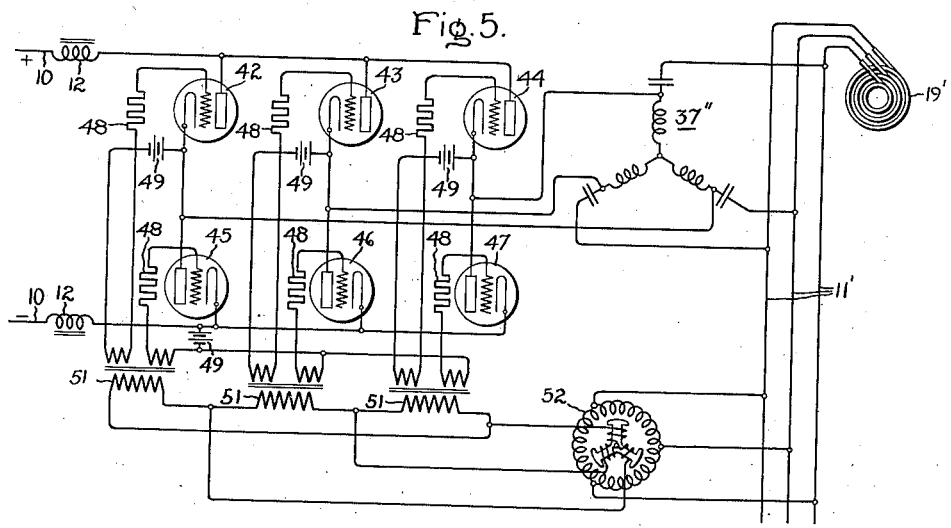

Patented Nov. 3, 1936

2,059,832

UNITED STATES PATENT OFFICE 2,059,832

ELECTRIC POWER CONVERTING APPARATUS

Clodius H. Willis, Princeton, N. J., and Burnice D. Bedford, Schenectady, N. Y., assignors to General Electric Company, a corporation of New York Application December 20, 1934, Serial No. 758,396

12 Claims. (Cl. 175—363)

Our invention relates to electric power converting apparatus and more particularly to converting apparatus for transmitting power by means of electric discharge devices or electric valves between an alternating current system and a direct current system by rectification or between a direct current system and an alternating current system by inversion.

Although not limited thereto our invention is particularly applicable for use in high voltage direct-current power transmission systems of the type described and claimed in United States Letters Patent No. 1,990,758, granted February 12, 1935, upon an application of Charles W. Stone and assigned to the assignee of the present invention. Briefly described, the system as disclosed in the Stone patent comprises a source of energy of constant voltage alternating current which is transformed to alternating current of constant value and then rectified by an electric valve rectifier for transmission at high-voltage constant direct current. The constant direct current is transmitted over a transmission circuit to a receiving circuit which includes an electric valve inverter for changing the transmitted energy to alternating current of constant value which is transformed to alternating current of constant voltage for distribution purposes. The electric valve converting stations of this system employ as one means of transforming alternating current from constant-voltage to constant-current or vice-versa, an impedance network comprising reactances of opposite sign and which in one form of the single phase type as illustrated are arranged in the form of a square known in the art as a monocyclic square.

In the converting stations of the system referred to in the above-identified Stone patent the commutating means of the electric valve apparatus is of the type determined in accordance with the power factor conditions usually existing on the supply circuit of a rectifier and the load circuit of an inverter and independently of the power factor characteristics of the apparatus for transforming the alternating current of constant voltage to constant current or vice versa. By reason of the fact that the usual commercial load on an inverter is of lagging power factor, relatively complicated commutating means has been employed heretofore since with simple phase commutation, to be explained hereinafter, the electric valve inverter will supply only loads with leading power factor. Also with the usual simple phase controlled electric valve rectifier arrangement the power factor of the supply circuit is lagging and no simple means has been provided heretofore to control the power factor of the supply circuit at will by means of a controlled rectifier.

It is an object of our invention to provide new and improved electric valve converting apparatus.

It is another object of our invention to provide improved inverting apparatus whereby the usual loads of lagging power factor may be supplied with inverting apparatus normally capable of supplying only loads of leading power factor.

It is a further object of our invention to provide improved rectifying apparatus whereby the power factor of the supply circuit which would normally be lagging may be made leading and variable at will without otherwise affecting the operation of the apparatus as a rectifying device.

In accordance with our invention we employ in combination with a simple phase commutated gaseous or vapor electric valve converter, by which term we mean to include both a rectifier and inverter, means for effecting a reversal of the power factor angle or a reversal in character of increments of reactive power between the converter and the alternating current supply or receiver circuit connected thereto. We have discovered that networks of reactances of opposite sign such as the L and T networks of Paul Boucherot for transforming alternating current of constant voltage to constant current and vice versa, the arrangement of these reactances in the form of a square and known in the art as the monocyclic square, as well as polyphase networks of the same type, all of which we designate for want of a better generic term as monocyclic networks, reverse the power factor angle of the input side of the monocyclic network relative to the output side or vice versa. For example, with a leading power factor on the input side of the monocyclic network the power factor is lagging on the output side. With both the symmetrical and unsymmetrical networks, as hereinafter explained, we have found that it is a general characteristic of these networks that a load increment of lagging reactive kv-a. on the network appears to the supply circuit to have been an increment of leading reactive kv-a. In the specification and claims we have expressed this phenomenon of change in reactive kv-a. on the respective sides from lagging to leading, or vice versa, by the language that an increment of reactive kv-a. on one side of the network appears as an increment of reactive kv-a. of opposite character on the other side of the network. In the unsymmetrical network the increments of reactive kv-a. on one side may or may not appear as equal increments of opposite character on the other side depending upon the nature and degree of dissymmetry of the network. Where the monocyclic network is symmetrical, the power factor angles and also the increments of reactive kv-a. on the two sides of the network are equal in value. In order to express the nature of the change from a lagging power factor on one side of the monocyclic network to a leading power factor on the other side, or vice versa, we have used the expressions in the specification and claims "effecting a reversal of the power factor angle" or "effecting a reversal of the sign of the power factor angle". The "power factor angle" being the angle or equivalent angle for non-sinusoidal waves, of phase difference between the current and voltage for the particular circuit to which reference is made. Utilizing our discovery of this reversal of power factor angle or change in character of increments of reactive kv-a. on opposite sides of the monocyclic network we are able greatly to simplify electric valve inverter and rectifier circuits particularly from the point of view of the commutating means usually employed or obtain simplification of converter circuits for comparable operating characteristics. We are also able to provide a simplified rectifying means for imposing a controllable leading reactive component of current on the supply circuit instead of the usual lagging reactive component of current.

Figure 2:
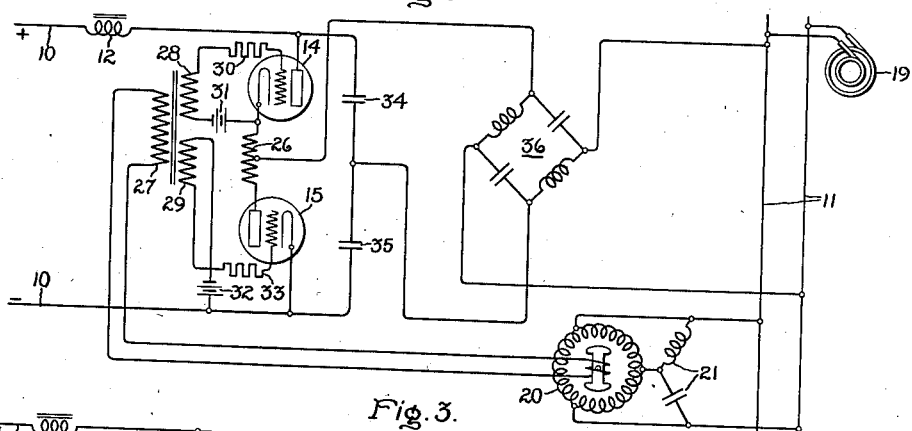
Figure 3:
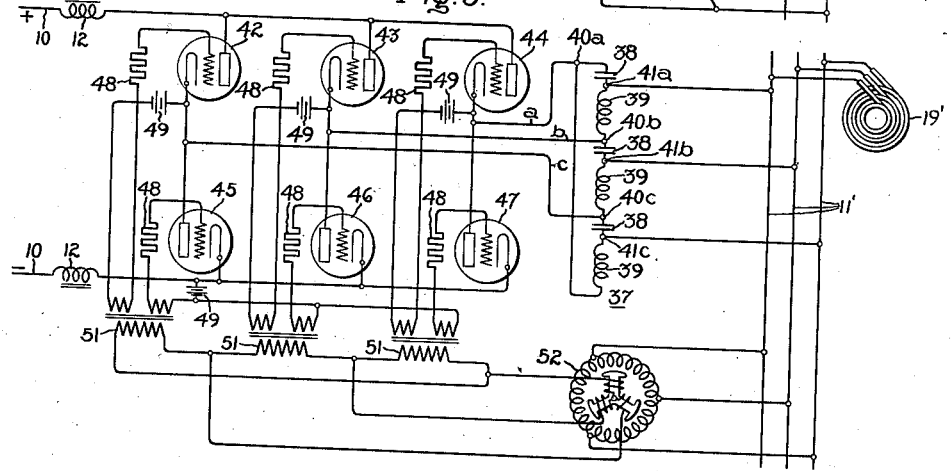

The novel features which we believe to be characteristic of our invention are set forth with particularity in the appended claims. The invention itself, however, will be better understood by reference to the following description taken in connection with the accompanying drawings in which Fig. 1 shows diagrammatically an embodiment of our invention comprising a parallel type of converting apparatus in combination with a monocyclic network of the T type, Fig. 2 shows diagrammatically another embodiment of our invention utilizing a series type of inverter in combination with a monocyclic square, Fig. 3 shows diagrammatically a further embodiment of our invention adapted for polyphase circuits in which a three-phase full wave converter is combined with a mesh or delta connected monocyclic network, Fig. 4 is a modification of the arrangement shown in Fig. 3 wherein a star connected monocyclic network is employed with the capacitance units connected at the neutral point of the star connection, and Fig. 5 is a modification of the arrangement shown in Fig. 4 wherein the inductance units are connected at the neutral point of the star.

Referring now to Fig. 1 of the drawings, we have illustrated an electric valve converting apparatus which will be considered both from the point of view of its operation as an inverter and then as a rectifier. The apparatus as illustrated is adapted to transmit energy between a direct current circuit 10 and an alternating current circuit 11 and is of the type known in the art as a parallel inverter. A smoothing reactor 12 is connected in series relation with the circuit 10. This apparatus comprises a transformer 13 having a secondary winding connected to the alternating current circuit 11 and a primary winding provided with an electrical midpoint connected to one side of the direct current circuit 10 and a pair of end terminals connected to the other side of the direct current circuit 10 through vapor electric discharge valves 14 and 15. The vapor electric discharge valves 14 and 15 are each provided with an anode, a cathode, and a control electrode or grid for controlling the starting of current in the cathode-anode circuit. The control grids of the valves 14 and 15 are connected to their common cathode circuits through opposite halves of the secondary winding of a grid transformer 16, a bias battery 17 and current limiting resistors 18. The primary winding of the grid transformer 16 may be energized from any suitable alternating current circuit of the frequency which it is desired to supply to the circuit 11, or as illustrated when the circuit 11 is connected to an independent source of energy indicated by the generator 19, the primary winding of transformer 16 is connected to the circuit 11 through a suitable phase shifting arrangement such, for example, as a rotary phase shifting transformer 20 provided with phase splitting means 21.

It will be observed that no special commutating means is provided and that the inverter or rectifier as the case may be operates as a phase commutated converter. By phase commutation is meant the transfer of current as effected by the instantaneous difference of potential between the phases involved on the respective anodes of a single phase circuit. This type of commutation is at present used almost exclusively in rectifiers since an inverter employing phase commutation can ordinarily supply only a load of leading current characteristic or leading power factor. Whereas a phase commutated rectifier will operate only in the lagging quadrant or where the power factor of the load drawn by the rectifier is between unity and zero lagging. Phase commutation in an inverter corresponds to a condition of unstable equilibrium. Any delay in the commutation of current, or any abnormal increase in current, results in insufficient commutating voltage and a failure to commutate. Phase commutation as applied to a rectifier has the opposite characteristic because any delay in commutation, or abnormal rise of current, results in an increased commutating voltage which corresponds to a condition of stable equilibrium. This operating condition of the phase commutated rectifier, however, imposes the usually undesirable lagging load on the supply circuit.

Now in accordance with our invention we employ the simple phase commutated converter and connect the secondary winding of the transformer 13 to the alternating current circuit 11 through a power factor angle reversing means which we have illustrated in this embodiment, by way of example, as a monocyclic network 22 of the T type. This network comprises a combination of two equal inductive reactances 23 and 24 in series relation with each other and with the load current of the receiver circuit, and shunted midway between the inductive reactances by a capacitive reactance 25 equal in value to one of the inductive reactance units. This arrangement transforms alternating current of constant value to constant voltage or vice versa in a manner known by those skilled in the art. It has been known and stated by several investigators that the power factor is the same on the two sides of the monocyclic network but it has not been observed, or at least not recognized and reported heretofore, that there is a power factor angle reversal. In fact, several of the leading early investigators of this network have indicated by erroneous mathematical interpretation that no reversal of the power factor angle takes place. However by correct mathematical interpretation corroborated by actual tests and oscillographic studies we have definitely determined that a reversal of the power factor angle is effected by the monocyclic network. With the combination as illustrated we are enabled to supply the usual lagging loads from the inverter and yet operate the inverter by means of phase commutation or with the converter operating as a rectifier under grid or analogous control we are able to draw a leading load of any desired amount from the alternating current supply circuit.

By reason of the particular applicability of our invention to high voltage constant direct current systems of transmission as disclosed in the aforementioned Stone patent, the operation of the converter will be described in accordance with the characteristics of such a system. Let it be assumed that the circuit 10 is a source of constant direct current. The constant direct current is inverted into alternating current of constant voltage by means of the electric valves 14 and 15 and their associated grid circuits, the secondary winding of transformer 13, and the monocyclic network 22. Assuming that valve 14 is initially made conducting, current will flow from the direct current line through the left-hand portion of the primary winding of transformer 13, through the valve 14 to the circuit 10. In accordance with the method of commutation employed in the illustrated arrangement the transfer of current from valve 14 to valve 15 is effected by phase commutation or in other words by the instantaneous difference of potential of the respective anodes of the valves.

It is convenient first to consider commutation with the converter operating as a rectifier. In the converter operating as a rectifier with the circuit 11 considered as a source of alternating current there is potential available to transfer current between the anodes of the valves. At a given time after tube 14 becomes conductive the instantaneous voltage at the anode of tube 15 will exceed the voltage at the anode of tube 14 and current will then transfer from tube 14 to tube 15. If the current transfer is delayed by grid control, the phase difference of the instantaneous voltages which are available for commutation increases as the current wave lags more and more behind the voltage wave. Hence phase commutation in a rectifier will operate only in the lagging quadrant, and without employing the features of our invention the power factor of the load drawn by the rectifier lies between unity and zero lagging. Phase commutation as applied to the converter when operating as an inverter may be explained as follows. In accordance with our previous assumption tube 14 was initially made conductive when the instantaneous voltage at the anode of tube 14 was higher or more positive than the instantaneous voltage at the anode of tube 15. The voltage across tube 14 when conducting is roughly only the tube drop so that the voltage across tube 15 becomes more negative. Therefore a current entering the inverter against the counter-electromotive force of the conducting section of the primary winding of transformer 13 will be transferred to tube 15 by the instantaneous difference between the voltage at the anode of tube 14 and the voltage at the anode of tube 15. However this transfer will take place in the proper direction only when the anode to which current is to be transferred is more positive than the then conducting anode. Phase commutation as applied to an inverter is operative only when the current wave leads the voltage wave, that is, the load supplied by the inverter must have a leading characteristic.

By reason of the interposition of the monocyclic network between the alternating current circuit and the converter the phase controlled rectifier instead of being equivalent to a lagging load on the alternating current system becomes equivalent to a leading load on the alternating current system since the monocyclic network reverses the power factor angle of the load on the alternating current system. The power component of the current supplied to the monocyclic network depends on the rectifier load. If the rectifier is short circuited, the power component of the current is just sufficient to supply the losses. The reactive component of the current is determined by the phase shift on the grids of the rectifier tubes. A very small phase shift of the grids of a grid controlled rectifier is sufficient to produce a large increase in the leading current drawn by the monocyclic network. In this manner it is possible to control the leading component of the current in a manner similar to field control on a synchronous condenser.

On the other hand, when operating the phase commutated inverter with the monocyclic network interposed between it and the load circuit it is now possible to supply the usual lagging load from the output side of the monocyclic network and yet have the converter operate into what appears to be a leading load.

In the application of our invention to the transmission of power at high voltage constant direct current, it is important to point out another operating feature of the converter just described. A constant potential inverter requires a grid phase shift of approximately 180 degrees to change from inverter to rectifier operation. With the present inverter operating on constant direct current through a monocyclic network, no grid phase shift is required to change from inverter to rectifier operation. The monocyclic network operates as a current regulator. When there is no impressed voltage from the direct current circuit, the monocyclic network when energized from the receiver circuit swings over and supplies a voltage to circulate the current and the inverter operates as a rectifier. If now a voltage be applied to the direct current circuit in such a direction as to tend to increase the current of the inverter, the monocyclic network reverses its voltage and holds the current down to the normal value. The apparatus thus automatically swings from rectifier to inverter operation with the application of direct voltage. No change or adjustment of the grid phase is necessary. In this respect the constant current inverter operating through a monocyclic network is the only tube arrangement known at the present time which will inherently and automatically without complicated control means regenerate or reverse power flow.

In Fig. 2 we have shown another embodiment of our invention in which the inverter is of the so-called series type as contrasted with the arrangement shown in Fig. 1 which is commonly designated as a parallel-type inverter. For purposes of easy comparison corresponding elements are designated by the same numerals as in Fig. 1. The direct current circuit 10 with the smoothing reactor 12 and the alternating current circuit 11 are interconnected by the series type inverter. This inverter comprises two electric valves 14 and 15 which are connected in series relation across the direct current circuit with a mid-tapped reactor 26 interposed between the cathode and anode of the respective valves. Each valve is provided with an anode, a cathode and a control electrode. The grid excitation is obtained from any suitable circuit and as illustrated is obtained from the alternating current circuit 11 through a rotary phase shifting means 20—21 connected to energize the primary winding of a grid transformer 27. The grid transformer 27 is provided with two secondary windings 28 and 29. The secondary winding 28 is connected to energize the grid and cathode circuit of valve 14 through a bias battery 31 and a current limiting resistor 30. Similarly, the secondary winding 29 is connected to energize the grid cathode circuit of valve 15 through a bias battery 32 and a current limiting resistor 33. Capacitors 34 and 35 are connected in series relation and in parallel across the series connected valves. A monocyclic network shown by way of example as a monocyclic square 36 has its input terminals (diagonally opposite junction points) connected to the mid-tap of reactor 26 and to a point between the capacitors 34 and 35. The output terminals or the conjugate points of the monocyclic square are connected to the alternating current circuit 11. The alternating current circuit 11 is energized by a source of alternating current indicated by the generator 19.

The operation of the inverter illustrated in Fig. 2 will be explained first without consideration of the effect of the introduction of the monocyclic network. The grid transformer 27 excites the grids of the valves 14 and 15 so that one is positive when the other is negative. The bias batteries 31 and 32 keep the grids normally negative. With the grids thus excited and voltage applied to the direct current circuit, the grid of valve 14 becomes positive and current flows through valve 14. Capacitor 34 will be discharged and capacitor 35 charged through half of the reactor coil 26 and the monocyclic network 36. Valve 15 carries no current since its grid will be negative on the basis of the previous assumption. As soon as the capacitor 35 is charged the current stops. At the beginning of the next half cycle of excitation the grid of tube 15 becomes positive and that of tube 14 negative, and tube 15 becomes conductive. On these conditions capacitor 35 which has become charged will begin to discharge and capacitor 34 will begin to be charged through the monocyclic network 36 (through which the current now reverses) and through the other half of reactor coil 26 and valve 15.

With the interposition of the monocyclic network 36 we may rely on the inherent action of the circuit, namely, phase commutation, to reduce the current in one valve to zero within a half cycle of the starting of the current in the other valve. In this event the capacity reactance of the capacitors 34—35 considered as in parallel relation with the load circuit may be made lower relative to the inductive reactance of one-half of the reactor coil 26 and of much smaller kv-a. capacity than when relied upon for effecting commutation.

In Fig. 3 we have shown another embodiment of our invention for transmitting energy between a direct current circuit 10 and a three phase alternating current circuit 11'. Smoothing reactors 12 are connected in the direct current circuit and an independent source of polyphase alternating current, indicated by the generator 19', is connected to the circuit 11'. In accordance with our invention we employ a polyphase monocyclic network 37 comprising capacitors 38 and inductors 39 arranged in a mesh or delta connection with input terminals 40a, 40b, and 40c and output terminals 41a, 41b, and 41c connected to the respective phase lines of the alternating current circuit 11'. The several terminals 40a, 40b, and 40c are connected to one side of the direct current circuit 10 through a group of similarly disposed electric valves 42, 43, and 44 and to the other side of the direct current circuit 10 through an oppositely connected group of similarly disposed electric valves 45, 46, and 47, respectively. Each of the electric valves 42-47, inclusive, is provided with an anode, a cathode and a control electrode or grid. To commutate the current between the several similarly connected electric valves we rely on phase commutation as explained in detail in connection with the embodiment illustrated in Fig. 1.

In order to render the electric valves 42-47, inclusive, alternately conductive and non-conductive in the proper sequence the grid of each of these valves is connected to its respective cathode circuit through a current limiting resistor 48 and a bias battery 49 and the proper phase winding of the secondary windings of a grid transformer, the primary windings 51 of which may be energized from the alternating current circuit 11' through any suitable phase shifting arrangement, such for example as a rotary phase shifting transformer 52. In case the alternating current circuit 11' is not connected to an independent source of electromotive force for determining its frequency, the primary winding of the phase shifting transformer 52 may be energized from any suitable source of alternating current of a frequency which it is desired to supply to the circuit 11'.

The general principles of operation of the above described apparatus may be described as follows: If it be assumed that the apparatus is operating as an inverter, transmitting energy from the direct current circuit 10 to the alternating current circuit 11', and that the electric valves 43 and 45 are initially rendered conductive, current will flow from the upper positive side of the direct current circuit through valve 43, the capacitor and inductor between terminals 40b and 40c, the valve 45 to the other side of the direct current circuit. Assuming phase rotation with reference to the terminals 40a, 40b and 40c to be b c a, substantially sixty electrical degrees later, electric valve 47 will be rendered conductive and the current commutated from valve 45 to 47. Sixty degrees later, electric valve 42 will be rendered conductive and the current will be commutated from the valve 43 to the valve 42. In this manner the current is successively commutated between the several valves 43, 42, 43, and 44, and 45, 47, and 46 to supply polyphase current to the circuit 11'.

In the embodiment of our invention illustrated in Fig. 4 we have illustrated the same inverter arrangement and have therefore indicated like elements with the same reference numerals. The change in this embodiment from that shown in Fig. 3 is the arrangement of the monocyclic network 37' with the capacitors and inductors arranged in star and with the capacitors connected at the neutral point of the star.

The T type monocyclic network as in Fig. 1, the monocyclic square as in Fig. 2, and the mesh or delta arrangement as in Fig. 3 are what we term symmetrical monocyclic networks by reason of the fact that between phase conductors of the constant current circuit of the monocyclic network and the constant voltage circuit there is always included a capacitor and an inductor in series relation. The arrangement as shown in Fig. 4 is an unsymmetrical monocyclic network from this point of view in that between phase conductors of the constant current side of the network only capacitors are included. However, this form of the monocyclic network shown in Fig. 4 has the advantage that it improves the wave shape of the voltage and current on the alternating current circuit by suppressing the harmonics caused by the converter which would normally appear in the alternating current circuit. It has the further property of imposing a lagging load on the alternating current circuit 11' in the event of a short circuit on the direct current circuit 10 whereas the symmetrical monocyclic network imposes no load on the circuit 11 in the event of a short circuit on the direct current system except that necessary to furnish the power losses in the monocyclic network. The arrangement has the further advantage of permitting more rapid commutation from one valve to the next. It will occur to those skilled in the art that the unsymmetrical network as illustrated in Fig. 4 may be made symmetrical in the sense in which we use the term by introducing inductors having a reactance equal to the inductors of the network in the conductors leading from the input terminals 40a, 40b, and 40c without departing from our invention in its broader aspects.

The embodiment of our invention shown in Fig. 5 is another modification of the arrangement shown in Fig. 3 and similar to the arrangement shown in Fig. 4. Since we have shown the same arrangement of electric valves and cooperative elements for the inverter we have indicated like parts with the same reference numerals. The change in this embodiment from that shown in Fig. 3 is the arrangement of the monocyclic network 37" with the capacitors and inductors arranged in star and it differs from the arrangement shown in Fig. 4 by having the inductors connected at the neutral point of the star rather than the capacitors. If it is found desirable to make a symmetrical monocyclic network as referred to hereinbefore, it will occur to those skilled in the art that a capacitor of an impedance the same as each network capacitor may be inserted in each conductor from the converter to the terminals 40a, 40b, and 40c, respectively, without departing from our invention in its broader aspects. The unsymmetrical arrangement as illustrated permits the harmonics caused by the converter to appear on the circuit 11' since there is only a capacitive connection from the converter output terminals to the phase conductors of the circuit 11'. However, the arrangement has the advantage of imposing a leading load on the alternating current circuit 11' in the event of a short circuit on the direct current circuit 10.

It is believed that the operation of the arrangements illustrated in Figs. 4 and 5 will be obvious from the description of the operating cycle of the arrangement shown in Fig. 3 and that no further description is necessary for an understanding of these embodiments of our invention.

While we have shown and described particular embodiments of our invention, it will be obvious to those skilled in the art that various changes and modifications may be made without departing from our invention in its broader aspects and we, therefore, aim in the appended claims to cover all changes and modifications as fall within the true spirit and scope of our invention.

What we claim as new and desire to secure by Letters Patent of the United States is:

1. In combination, a direct current circuit, an alternating current circuit, a phase commutated converter comprising a plurality of electric valves for interconnecting said circuits, means for effecting a reversal of the sign of the power factor angle between the converter and the alternating current circuit, and means for varying the conductivity of said electric valves.

2. In combination, an alternating current supply circuit, a direct current load circuit, rectifying apparatus comprising a plurality of electric valves interconnecting said circuits, an impedance network comprising a plurality of reactances of opposite sign interposed between said supply circuit and said inverter and connected and proportioned so as to reverse the sign of the power factor angle between the converter and the alternating current circuit, and means for varying the period of conductivity of each of said electric valves in each half cycle of the positive anode voltage of the respective valves.

3. In combination, an alternating current supply circuit, a direct current load circuit, rectifying apparatus comprising a plurality of electric valves for interconnecting said circuits, each of said valves being provided with an anode, a cathode, and a control electrode, a monocyclic network interposed between said supply circuit and said rectifying apparatus, and means for varying the phase relation between the voltages of the grid and anode of each of said valves.

4. In combination, a source of direct current, a phase commutated electric valve inverter connected to be energized from said source, an alternating current load circuit having a lagging power factor connected to be supplied from said inverter, and means connected between said load circuit and said inverter and so constructed and arranged that a change of reactive kv-a. on one side of said means appears as a change of reactive kv-a. of opposite character on the other side of said means for changing the power factor of the load as imposed on said inverter.

5. In combination, a source of direct current, a phase commutated electric valve inverter connected to be energized from said source, an alternating current load circuit having a lagging power factor connected to be supplied from said inverter, and a monocyclic network connected between said load circuit and said inverter.

6. In combination, a direct current circuit, a polyphase alternating current circuit, a polyphase full-wave electric valve converter interconnecting said circuits, and a polyphase monocyclic network interposed between said converter and said alternating current circuit.

7. In combination, a direct current circuit, a three phase alternating current circuit, a three-phase full-wave electric valve converter interconnecting said circuits, and a mesh connected monocyclic network interposed between said converter and said alternating current circuit.

8. In combination, a constant direct current supply circuit, a constant voltage three phase alternating current load circuit, a three-phase full-wave electric valve inverter for transmitting power from said direct current circuit to said alternating current circuit, and a delta-connected monocyclic network of capacitors and inductors interposed between said inverter and said alternating current circuit, the output terminals of said inverter being connected to alternate junction points between the respective capacitors of said network and the respective phase conductors of the alternating current circuit being connected to the conjugate junction points of said network.

9. In combination, a direct current circuit, a three phase alternating current circuit, a three phase full wave electric valve converter interconnecting said circuits, and a star connected monocyclic network interposed between said converter and said alternating current circuit.

10. In combination, a constant direct current supply circuit, a constant voltage three phase alternating current load circuit, a three-phase full-wave electric valve inverter for transmitting power from said direct current circuit to said alternating current circuit, and a polyphase star-connected monocyclic network of capacitors and inductors interposed between said inverter and said alternating current circuit, said network having a capacitor and an inductor connected in each leg of said network with the capacitors connected at the neutral point of the network.

11. In combination, a constant direct current supply circuit, a constant voltage three-phase alternating current load circuit, a three-phase full-wave electric valve inverter for transmitting power from said direct current circuit to said alternating current circuit, and a polyphase star-connected monocyclic network of capacitors and inductors interposed between said inverter and said alternating current circuit, said network having a capacitor and an inductor connected in each leg of said network with the inductors connected at the neutral point of the network.

12. In combination, a direct current circuit, an alternating current circuit, a phase commutated converter comprising a plurality of electric valves for interconnecting said circuits, means connected between said alternating current circuit and said converter and so constructed and arranged that a change of reactive kv-a. on one side of said means appears as a change of reactive kv-a. of opposite character on the other side of said means, and means for varying the conductivity of said electric valves.

CLODIUS H. WILLIS.
BURNICE D. BEDFORD.